No. 704,040. Patented July 8, 1902.
L. HOUZE.
GLASS TANK.
(Application filed Mar. 29, 1901.)
(No Model.) 3 Sheets—Sheet 1.
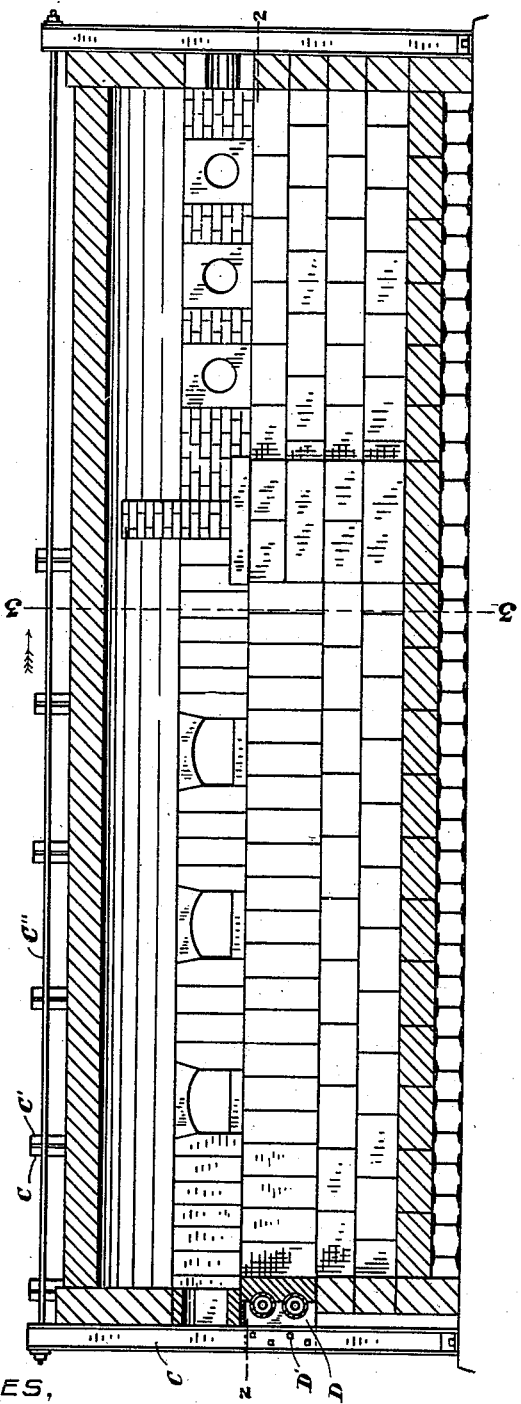
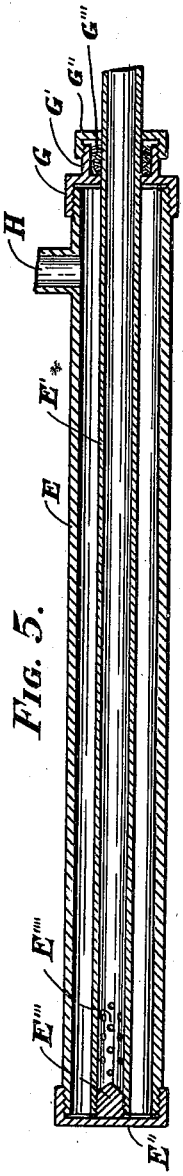

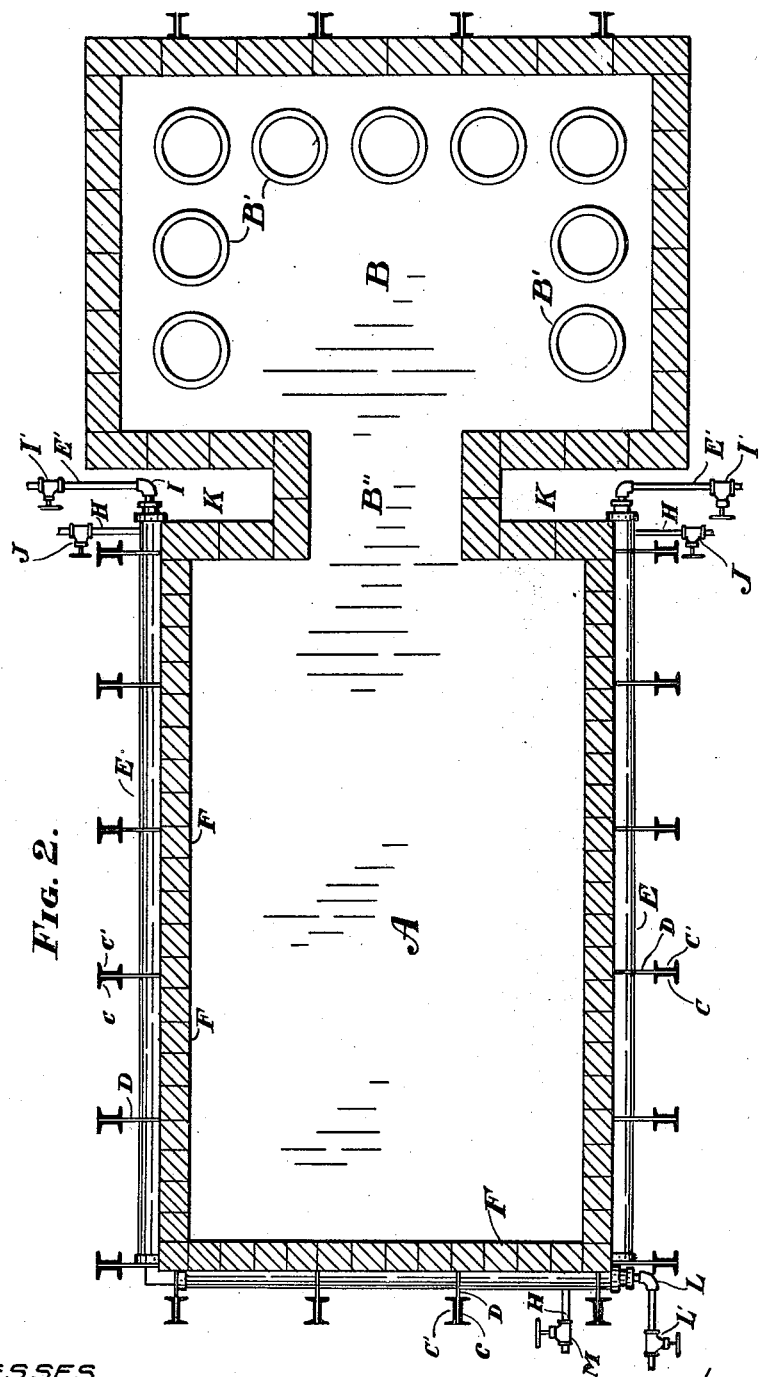

No. 704,040. Patented July 8, 1902.
L. HOUZE.
GLASS TANK.
(Application filed Mar. 29, 1901.)
(No Model.) 3 Sheets—Sheet 3.

WITNESSES.
Thomas L. Ryan
Jas. A. Harvey

INVENTOR,
Luc Houze
by
W. DuVal Brown
ATTORNEY.

UNITED STATES PATENT OFFICE.

LUC HOUZE, OF HARTFORD CITY, INDIANA.

GLASS-TANK.

SPECIFICATION forming part of Letters Patent No. 704,040, dated July 8, 1902.

Application filed March 29, 1901. Serial No. 53,377. (No model.)

*To all whom it may concern:*

Be it known that I, LUC HOUZE, a citizen of the United States, and a resident of Hartford City, in the county of Blackford and State of Indiana, have invented a new and useful Improvement in Glass-Tanks, of which the following is a specification.

This invention relates to an improvement in glass-tanks.

The aim and purpose of this invention is to construct a tank with cooling devices, so that the interior of the tank can be preserved against the intense heat and the life of the tank lengthened.

A further purpose is to provide means to convey cool water against the bricks forming the tank for cooling the bricks and preventing them from being burned or destroyed by the heat.

A still further purpose is to provide means for always keeping the water cool and at an even temperature and providing means for regulating the supply of the water.

These and other purposes not hereinbefore mentioned are accomplished by the construction illustrated in the accompanying drawings, wherein like letters of reference indicate corresponding parts in the several views, and in which—

Figure 3:
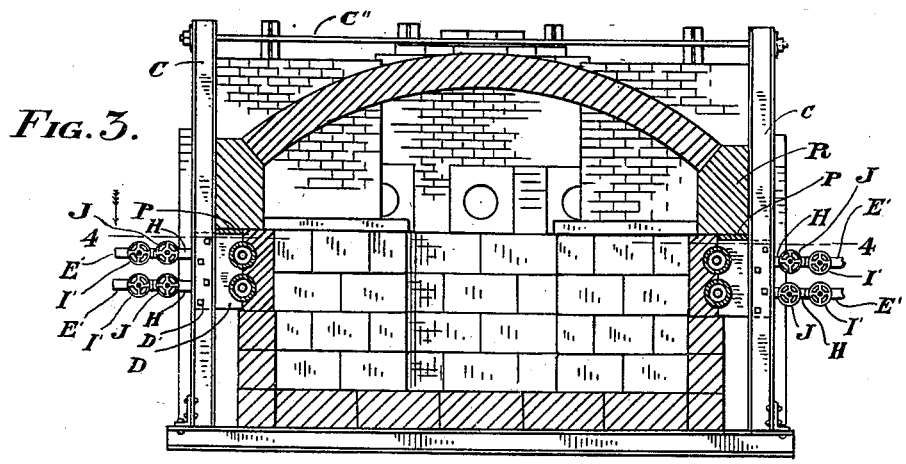
Figure 4:
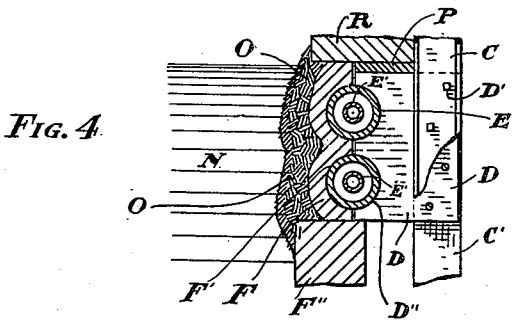
Figure 6:
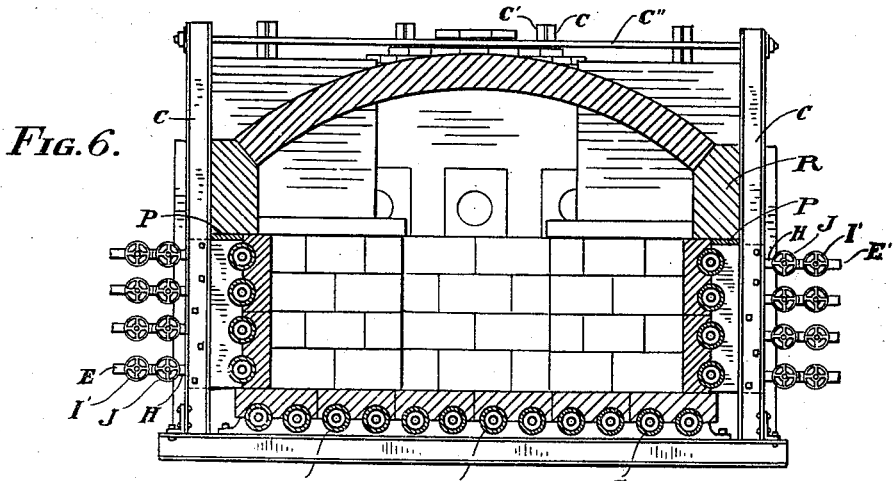

Figure 1 is a vertical central longitudinal section through a glass-tank, showing my improvements applied thereto. Fig. 2 is a horizontal section on the line 2 2, Fig. 1. Fig. 3 is a vertical cross-section on the line 3 3, Fig. 1. Fig. 4 is a detail view of the supporting means for the cooling-pipes and a brick in position, showing the shape of the brick and molten glass thereon after the tank has been in use. Fig. 5 is a longitudinal horizontal section through the cooling-pipe; and Fig. 6 is a section similar to Fig. 3, showing a modified form of arrangement of cooling-pipes.

In the drawings, A designates the melting-compartment, and B the gathering-compartment, of a glass-tank. B' designates the gathering-rings, and B'' the channel or passage-way connecting the two compartments, all of the ordinary construction.

In the melting of glass the melting-compartment is always the hottest, and in this compartment the bricks are more liable to burn out. I also find that the greatest amount of heat is near the upper surface of the glass and the greatest amount of damage to the bricks is at that point. I therefore place my cooling-pipes in the melting-compartment near the surface-line of the molten glass. While I will now describe such a construction, it is obvious that I can vary the arrangement and location of my cooling-pipes and place them both in the melting and gathering compartments and also in the passage-way and arrange them to entirely cover the side walls and also the bottom, if thought desirable, in certain constructions of tanks.

The buckstays of the tank consist of the two channel-bars C C', secured together by means of bolts in the usual well-known manner, and the upper ends of these buckstays are connected by the usual tie-rods C''. Between these channels C C' is positioned an inwardly-extending plate D, which is secured to the channels by means of bolts D'. By this construction the plate is rigidly secured to the channels and supported thereby. These plates are at a sufficient height from the bottom of the tank to be adjacent the upper surface of the molten glass and extend inwardly from the side and end bars of the melting compartment, as plainly shown in Fig. 2. The inner edge of these plates is provided with two semicircular grooves D'' where two cooling-pipes are used. Within each groove is positioned a cooling-pipe E. By referring to Fig. 4 it will be seen that these grooves cover about one-half of the periphery of the pipe. The outer surfaces of the pipes are covered with a brick F, which is provided with semicircular grooves F', which fit around the remaining portion of the periphery of the pipe. These bricks F are supported by a wall F'', which rests upon the bottom of the tank. By referring to Fig. 2 it will be seen that these cooling-pipes and bricks extend along the side and end walls of the melting-compartment. By referring to Fig. 5 it will be seen that these cooling-pipes have an inner pipe E', which acts as an inlet for the cool water. The rear end of the pipe E is provided with a cap E''', which is screwed thereon. The front end is provided with a cap G, which has an annular flange G' of smaller diameter than the cap extending outwardly. The outer end of this flange is screw-threaded and is provided with a cap G″, screwed thereon. These caps G G″ are provided with a central opening, through which passes the inlet-pipe E′. Located between the outside of the pipe E′ and the interior of the flange G′ is a stuffing G‴, so that a tight joint is formed to keep the water within the pipe E. Extending inwardly from the cap E″ is a screw-threaded stud E‴. The rear end of the inlet-pipe has its interior screw-threaded and is screwed onto the stud E‴. Adjacent the rear end of this pipe are a series of perforations E″″. The outer pipe E is provided with an outlet-pipe H adjacent the inlet end of the pipe E′.

By referring to Fig. 2 it will be seen that there is an opening K in the walls between the melting and gathering compartments of the tank. The front ends of the cooling-pipes located on the side walls of the melting-compartment terminate in this opening K. The inlet-pipe E′ in the opening is provided with an elbow I, and the pipe extends outward away from the furnace and is provided with a controlling-valve I′. The outlet-pipe H is also provided with a controlling-valve J.

The pipes located on the end wall of the melting-compartment are constructed in a similar manner to the pipes on the side walls. The inlet-pipe E′ is provided with an elbow L at its front end, and the pipe then extends away from the tank and is provided with a valve L′. The outlet-pipe is also provided with a valve M.

In the construction of cooling-pipe as described the cool water entering by the interior pipe E′ and then passing to the rear end and escaping through the perforations E″″ into the outer pipe and then returing to the front end and passing out through the outlet-pipe H, I am enabled to always keep the water in both pipes cool and at an even temperature. The cool water entering in the pipe E′ will cool the water in the larger pipe E, surrounding the same, and prevent the outer pipe from becoming too hot and melting. It also makes an even flow of water in the pipe, and as the outer pipe is kept cool it will also keep the adjacent bricks F cool. By having the inlet-pipe E′ and outlet-pipe H the same size the pipes are constantly kept full of water.

I find that after the tank has been in use for a period that the intense heat within the tank will have a tendency to melt the brick F, so that it will gradually conform with the contour of the pipes E, as shown in Fig. 4. When these bricks become sufficiently thin, they will become cool all the way through and make the molten glass N chill, as shown at O, forming a covering for the brick, so that the same will last for an indefinite period. Inasmuch as the tank is in heat for an entire season or "fire," or from fall until spring, any means which will prevent the bricks from burning out during this period is of great advantage. The tanks as now constructed are liable to burn out at any time, and when it is necessary to replace any bricks the heat has to be withdrawn, thereby wasting much time and material. By this construction the bricks being kept cool cannot burn out and will last a whole fire, if not longer.

Resting on top of the plate D is a longitudinal plate P. On this plate the base of the arch R, forming the top of the tank, rests.

In Fig. 6 I show a modified form, wherein the cooling-pipes extend down to the bottom of the tank and a series of cooling-pipes S are disposed beneath the bottom of the same.

I am aware that many minor changes can be made in the construction and arrangement of parts without in the least departing from the nature and principles of my invention as claimed.

Having thus described my invention, what I claim as new, and desire to secure by Letters Patent, is—

1. The combination with a melting-tank, of a cooling-pipe within the tank consisting of an outer shell having an outlet adjacent one of its ends and both of its ends closed, a stud extending inwardly from the closed end of the shell farthest away from the outlet, an inlet-pipe extending into the shell through the end nearest the outlet, the inner end of the inlet-pipe being secured to and supported by the stud and provided with a series of perforations adjacent its inner end.

2. A glass-melting tank provided with cooling-pipes, supporting-bars on the outside of the furnace, a plate secured to the bars and provided with semicircular grooves, and bricks on the interior of the furnace also provided with semicircular grooves registering with the grooves in the plate the cooling-pipes being located in the grooves in the plate and bricks.

In testimony whereof I have hereunto set my hand in the presence of two witnesses.

LUC HOUZE.

Witnesses:
ARTHUR BEANQUART,
WM. DU VAL BROWN.